July 19, 1966     H. GUTHMANN     3,261,043
PROCESS FOR MAKING NUTS
Filed Dec. 24, 1963     3 Sheets-Sheet 1
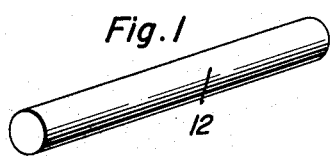
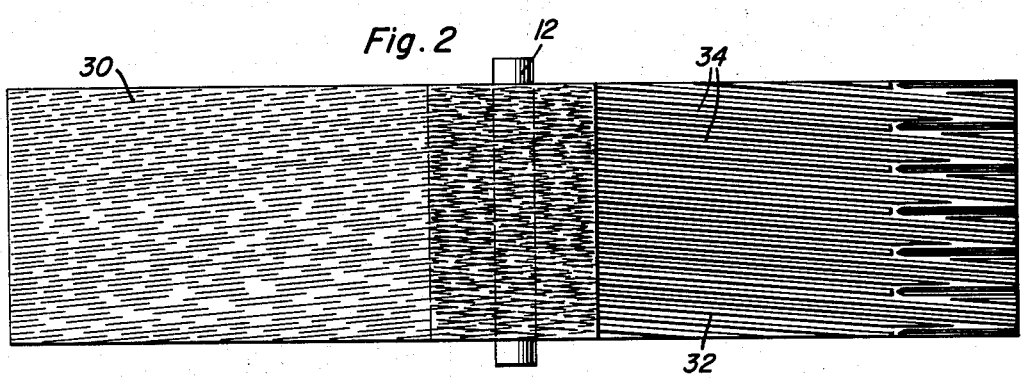
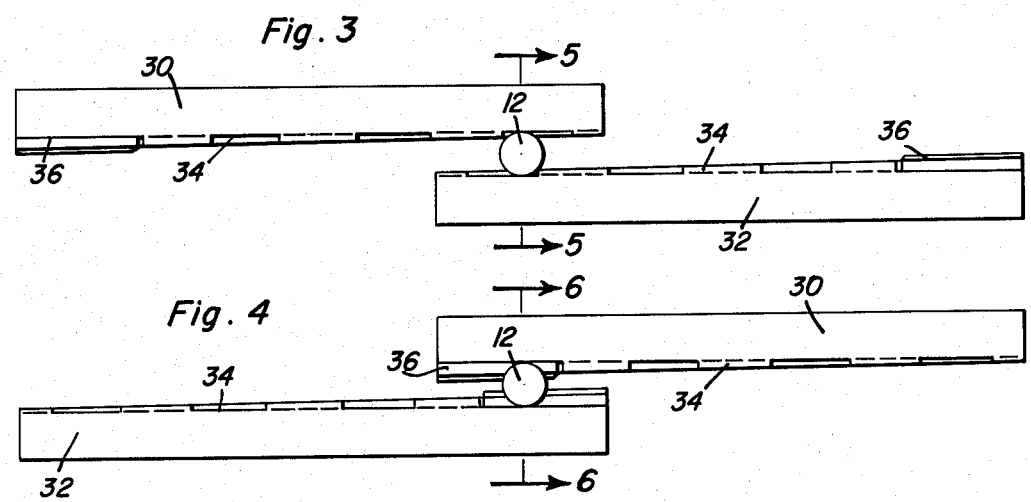
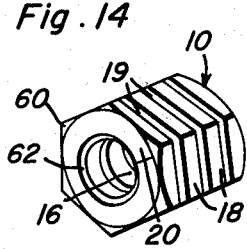
Hans Guthmann
        INVENTOR.
BY *Clarence A. O'Brien*
   and *Harvey B. Jacobson*
                      Attorneys July 19, 1966     H. GUTHMANN     3,261,043
PROCESS FOR MAKING NUTS
Filed Dec. 24, 1963                      3 Sheets-Sheet 2

Hans Guthmann
INVENTOR.

BY *Clarence A. O'Brien*
*and Harvey B. Jacobson*
Attorneys

Hans Guthmann
INVENTOR.

United States Patent Office 3,261,043
Patented July 19, 1966

3,261,043
PROCESS FOR MAKING NUTS
Hans Guthmann, 2825 Annapolis Road, Baltimore, Md.
Filed Dec. 24, 1963, Ser. No. 333,078
8 Claims. (Cl. 10—86)

This invention comprises a novel and useful lock nut and process of making same. It is the primary purpose of this invention to provide a novel lock nut having a greatly increased resiliently tensioned holding action upon a bolt together with a method of manufacturing the lock nut in a superior and more economical manner.

The primary object of this invention is to provide a one-piece lock nut construction having a greatly improved resilient gripping action upon a bolt and to provide a nut which will greatly facilitate and render more economical the fabrication of such lock nuts.

An important object of this invention is to provide a method whereby lock nuts of polygonal cross-section may be die-formed from round bar stock.

A further important object of the invention is to provide a lock nut consisting of an axially resilient, one-piece body of material wherein a radial contraction of the nut caused by an axial extension thereof shall effect an increased gripping action of the nut upon its bolt.

Another important object of the invention is to provide a one-piece resilient lock nut consisting of a single piece of spirally shaped material.

Still another object of the invention is to provide a method wherein a solid bar of round cross-section is partially severed along a spiral path thereabout and then is axially bored to provide a single spiral strip of material constituting the body of the lock nut.

Another important object of the invention is to provide a method wherein a one-piece axially resilient lock nut is produced from a bar of solid material by first forming a spirally finned bar in a continuous rolling operation between a pair of dies and then after boring out the center of the spirally finned bar to result in a nut flank comprising an integral open spiral.

Still another object of the invention is to provide a method of forming a spiral lock nut blank in a continuing or continuous operation by rolling a round bar between a pair of cooperating dies and during the initial portion of the rolling operation impressing a spiral groove upon the exterior surface of the bar and upon the final portion of the rolling operation severing the bar transversely into nut blanks of the requisite length each to form one nut.

A still further object of the invention is to provide a method whereby in an initial operation upon a round solid bar a spiral groove is cut upon the surface of the bar, the bar is severed into blanks each of the proper length to form a single nut, the blanks are axially bored to form open spirals of each blank, the convolutions of the open spirals are compressively deformed, the two end convolutions are intimately bonded together to form a thickened end convolution of the spiral blank and the blank is die-formed into a nut body of polygonal cross-sections.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a piece of solid round bar stock from which the lock nut of this invention is to be formed;

FIGURE 2 is a top plan view of the initial step of the method of forming the lock nut and showing the round bar stock being rolled between cooperating die members for spirally grooving the bar stock and separating the individual nut blanks therefrom;

FIGURE 3 is a view in side elevation of the die members at the beginning of the spiral cutting operation;

FIGURE 4 is a view similar to FIGURE 3 but showing the position of the die members during the completion of the spiral cutting operation and the beginning of the severing of the individual nut blanks from the bar stock;

FIGURE 14 is a perspective view of the completed lock nut in accordance with this invention.

Figure 5:
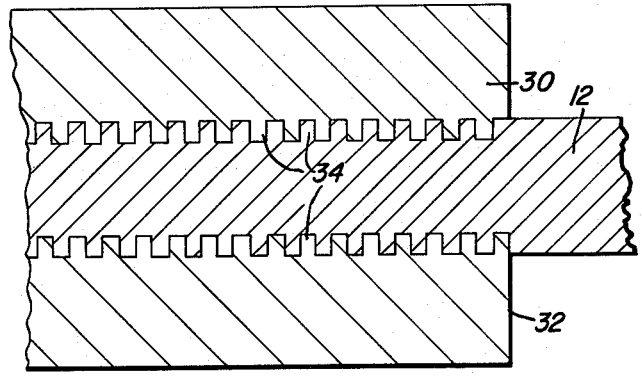
FIGURE 5 is a detail view taken upon an enlarged scale substantially upon the plane indicated by the section line 5—5 of FIGURE 3 and showing the initial portion of the die-forming operation to produce a spiral finned bar.
Figure 6:
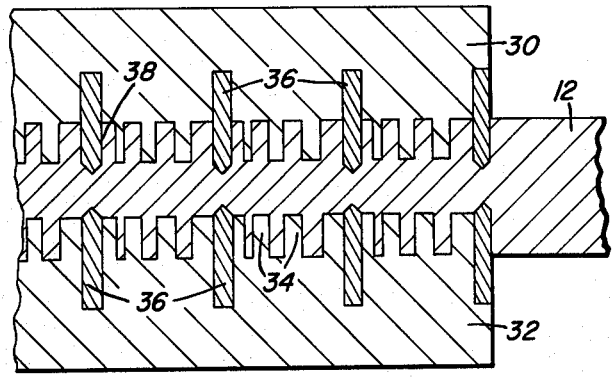
FIGURE 6 is a detail view taken upon an enlarged scale and similar to FIGURE 5, being taken substantially upon the plane indicated by the section line 6—6 of FIGURE 4 and showing the completion of the die-forming operation and the initiation of the severing operation of the nut blanks from the bar stock.

Reference is made first to FIGURE 14 wherein the reference numeral 10 designate generally the resilient spiral lock nut in accordance with this invention. In FIGURE 1 the numeral 12 indicates a piece of bar stock round in cross-section and from which the nut pin is fabricated. Again viewing FIGURE 14 it will be noted that the nut 10 is provided with an internal axial bore 16 therethrough which preferably is internally threaded. The nut consists of a single piece of metal which spirally slitted with a slit intersecting the bore 16 whereby to form axially spaced spiral convolutions as at 18. The nut is of regular polygonal cross-section being shown as hexagonal, although it will be appreciated that any other regular, noncircular cross-sectional shape may be employed as may be desired.

The numeral 19 designates the spiral slit extending along the entire length of the nut body so as to produce the convolutions 18 of the spiral nut. Due to this slit, the nut on the material of the nut body is given an inherent axial and radial elasticity such that upon stretching or axially elongating the nut, the spiral convolutions thereof will be caused to more tightly contract and grip the body of a bolt to which the nut may be attached and thereby establish a more firm and secure gripping action of the lock nut upon the bolt.

Figure 13:
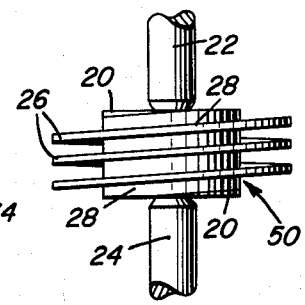
FIGURE 13 is a perspective view of a step in the method of forming a lock nut by which the end convolutions of the spiral nut blank are bonded together to produce thickened end convolutions.

Each end of the spiral strip which forms the nut 10, see FIGURES 13 and 14, terminates in a wedge-shaped terminal portion as at 20. In order to increase the strength of the nut, the two adjacent convolutions at each end of the nut are intimately bonded together to form a thickened terminal convolution. This bonding action, as shown in FIGURE 13, may conveniently be formed by an electrical welding operation as by placing the partially completed nut blanks between a pair of cooperating electrodes 22 and 24 at the opposite sides of the nut body and by placing disks 26 between each of the adjacent convolutions except the two end convolutions at each end of the body. With this arrangement, the flow of electrical current will weld or intimately bond the end portions 20 of the end convolution to the surfaces of the next adjacent convolutions 28 to thereby produce a thickened end convolution of the spiral nut body.

Figure 7:
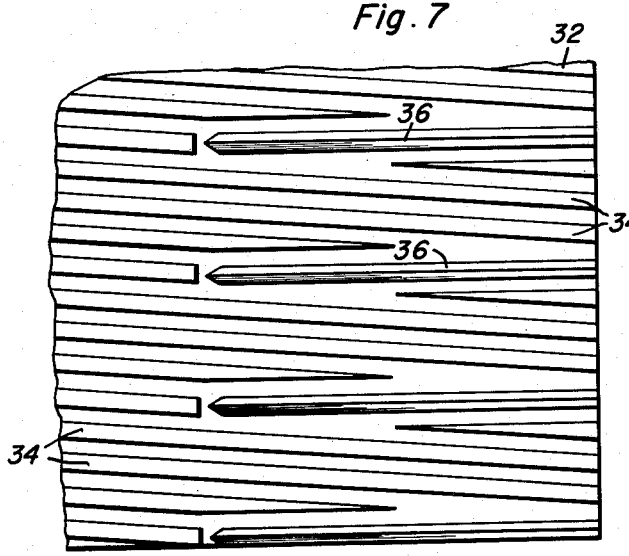
FIGURE 7 is a plan view of a portion of one of the spiral cutting dies.

Reference is now made particularly to FIGURES 2–6 for an understanding of the manner in which the spiral configuration of the nut body is produced from the round solid bar stock 12. Shown at 30 and 32 are a pair of complementary plate-like die bodies. The opposed or cooperating faces of the die bodies are planar being provided with a series of longitudinally extending die ribs 34, see also FIGURE 7, which are slightly inclined with respect to the medial longitudinal centerline of the die bodies at a sufficient inclination such that when the die bodies are pressed against the bar stock 12, a groove or slit will be formed therein of a spiral configuration. An important feature of the invention resides in the provision of an identical arrangement of the two sets of ribs 34 on the two die members so that the two dies will simultaneously press upon and slit the surface of the round bar stock 12 disposed therebetween.

As so far described the operation is as follows: With the bar stock 12 being disposed transversely of the two aligned but superposed die members 30 and 32 as shown in FIGURE 4, the two die members are reciprocated toward and from each other. As the two die members move toward each other the bar is rotated at its longitudinal axis for a number of complete revolutions, preferably three. As the bar rotates, the knife or rib elements 34 on the die bodies will progressively be forced deeper and deeper into the exterior surface of the bar stock due to the longitudinal tapering of these ribs or knives so as to produce a progressively increasing depth of slit in the die body. FIGURE 5 shows the position of the die body and the operation of the knives of the two die bodies upon the bar stock during this phase of the operation.

Either one or both of the die bodies adjacent the end portions thereof which is remote from the die body are provided with longitudinally extending relatively short cut-off knife elements 36. These elements likewise are of tapering depth from the inner to the outer ends so as to progressively effect a successively deeper transverse cut 38, see FIGURE 6, in the material of the bar stock. Preferably, the severing knives of the die bodies come into operation during the last complete rotation of the bar stock between the die bodies or in the position shown in FIGURE 4. Upon completion of the stroke of the dies, the bar which is now spirally finned along its length is annularly grooved in preparation for being severed into axially aligned nut blanks. Thus, a plurality of nut blanks are formed at one time. For this purpose, it will be apparent from a consideration of FIGURE 6 in conjunction with FIGURE 7 that the series of slitting knives and transverse severing knives of the die bodies are so positioned as to effect a properly timed previously described operation of spirally slitting the body of the stock 12 along its entire length and finally simultaneously completing the slitting of the body and the completing of the transverse severing grooves of the body.

Figure 8:
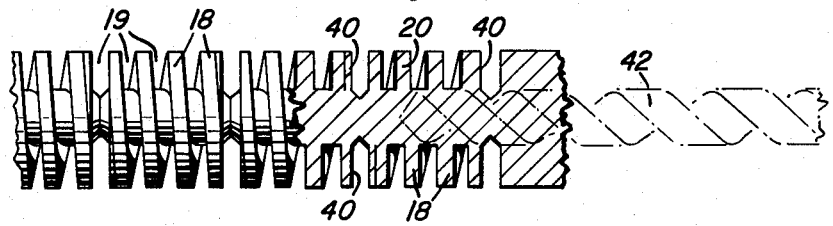
FIGURE 8 is an elevational view plainly in vertical section and showing in body lines the operation of a drill boring the center of the spirally finned bar to form an open spiral blank therefrom and to complete the severing of the nut blanks.

It will be observed from FIGURE 8 that the transverse severing cuts comprise annular channels shown at 40 which extend inwardly from the exterior of the body for a greater depth than that of the spiral slit 19 between the convolutions 18. At this point the body is still one continuous piece. As shown in FIGURE 8, a drill indicated in dotted lines at 42 is used to form an axial bore 16 as previously mentioned into the body passing entirely therethrough. Since this axial bore is of greater diameter than the inner diameter of the severing channels 40, the body which was previously spirally finned is now separated into a series of axially aligned spiral nut blanks indicated generally by the numeral 50. The spiral nut blanks are still round in cross-section.

Figure 9:
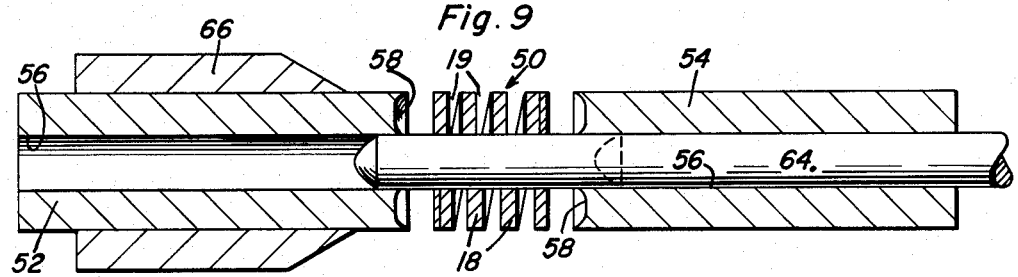
FIGURE 9 is a view in vertical section showing one of the spiral nut blanks mounted upon a mandrel and in a die press in preparation for the finishing steps upon the nut blank.
Figure 10:
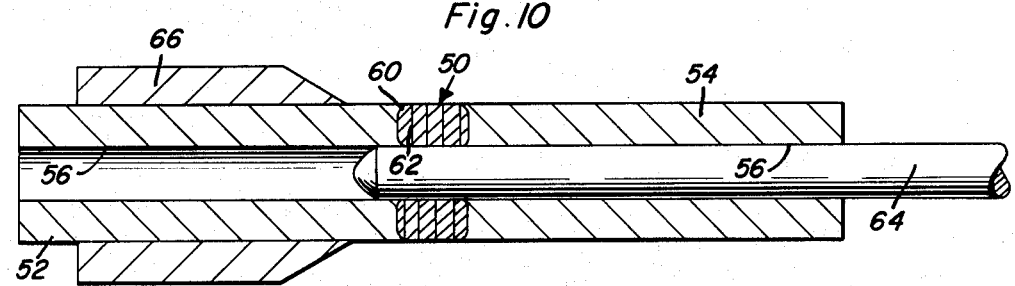
FIGURE 10 is a view similar to FIGURE 9 but showing the next successive step in the method by which the corners of the nut blank are rounded and the convolutions of the nut blank are compressively deformed axially into their finished relation.
Figure 11:
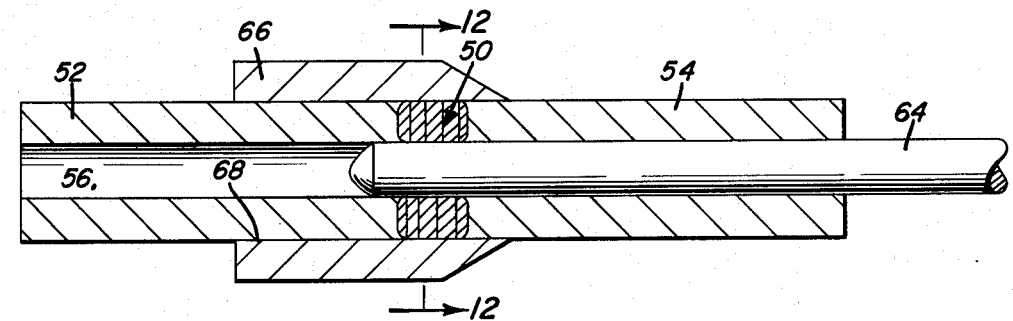
FIGURE 11 is a view similar to FIGURE 10 but showing the next successive step in converting by which the round blanks are shaped and deformed into a polygonal cross-section.

Reference is now made to FIGURES 9–11 which disclose somewhat diagrammatically any suitable form of apparatus for deforming and shaping the finned spiral nut blanks into the finished spiral nut. A pair of cooperating axially aligned dies 52 and 54, each having an axial bore 56 therein are mounted upon any suitable mechanism, not shown, and which in itself forms no part of this invention. At their opposed faces the dies are provided with cup-shaped die recesses 58 of sufficient size to each engage the end portion of a spiral nut blank and form thereon the beveled peripheral surface 60 and the inner beveled peripheral surface 62, see also FIGURE 14. Slidably mounted in the bore 56 of the die 54 is a mandrel 64 likewise operated and supported in any suitable manner, not shown. The mandrel 64 is adapted to snugly receive thereon the bore 16 of the finned nut blank 50 as shown in FIGURE 9. The mandrel is then moved into the extremity of the bore 56 of the die 52 thereby retaining the nut blank 50 in place as shown in FIGURE 9. Thereupon the die section 54 is moved relatively toward the die section 52 so that the two die chambers 58 compressively engage the opposite extremities of the nut blank 50. This serves the two functions of first beveling the peripheral inner and outer surfaces of the opposite ends of the nut blank and also deforms and compresses the nut blank so that its convolutions are moved toward each other from the relatively widely spaced positions shown in FIGURE 8 to the final closely spaced positions shown in FIGURE 14.

Figure 12:
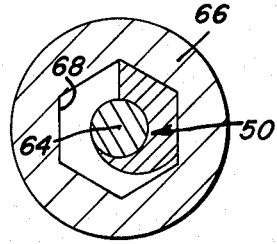
FIGURE 12 is a vertical transverse cross-section taken substantially upon the plan indicated by the section line 12—12 of FIGURE 11.

As a continuing operation, both die blanks are then moved together with the mandrel toward the left as viewed in FIGURE 10 and into a blank shaping die 66. The die 66, as shown in FIGURE 12, has an internal die chamber 68 which is of the requisite polygonal cross-sectional shape to impart to the spiral nut blank its desired final external shape. Upon withdrawal of the dies from each other and retraction of the mandrel 64, the now completely shaped lock nut is released.

At this point, the lock nut is clamped in position between the two electrodes as shown in FIGURE 13 with the spacers 26 being disposed between convolutions whereby the two end convolutions at each end of the lock nut are intimately bonded together as by welding to produce a lock nut having thickened end convolutions. Thereafter, if desired, the internal bore 16 within the lock nut is internally threaded in any suitable manner and the lock nut is now ready for use.

An important feature of this invention resides in the performing of the initial step of spirally slitting the bar stock 12 while the latter is in a hot condition, and thereafter drilling out the axial bore, axially compressively deforming the spiral nut blank, shaping the ends of the latter and also bonding the end convolutions and internally threading the bore thereof while the blank is cold. This cold working of the blank materially increases the physical properties of the material.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restored to, falling within the scope of the invention as claimed.

What is claimed as new is as follows:

1. A method of fabricating lock nuts from solid cylindrical blanks comprising the steps of heating a solid cylindrical blank to a predetermined temperature, rotating said solid blank about its longitudinal axis while compressing it between oppositely moving complementary dies in order to impress, without cutting, a spiral groove therein, forming an axial bore through said grooved blank of a diameter greater than the internal diameter of said spiral groove and intersecting said spiral groove along its entire length thereby producing an open spiral body, and shearing said spiral body into a rectangular polygonal shape by forcing said open spiral body through a die of polygonal cross-section.

2. The method of claim 1, including the step of intimately joining the adjacent pair of convolutions at one end of said body thereby providing a thickened terminal convolution.

3. The method of claim 1, including the step of intimately joining the adjacent pair of convolutions at one end of said spiral body and thereby providing a thickened terminal convolution and thereafter internally threading said bore.

4. The method of claim 1, including the step of internally threading said bore.

5. The method of claim 1, including the step of continuing said rotation for a plurality of complete revolutions of said solid blank while causing said dies to progressively deepen said spiral groove.

6. The method of claim 5, including forming grooves in said solid blank transversely thereof thereby defining axially aligned spiral nut blanks by said complementary dies during the final portion of the impressing of the spiral groove in said solid blank.

7. The method of claim 1, wherein said step of rotating in order to impress, without cutting, includes during its final portion the step of partially transversely severing said spiral body into a plurality of axially aligned spiral nut blanks.

8. The method of claim 1, including the step of mounting said spiral body upon a mandrel and axially compressing said spiral body and decreasing the space between adjacent convolutions, and then moving said spiral body while mounted on said mandrel through said die thereby shearing portions of the outer surface of said body.

References Cited by the Examiner

UNITED STATES PATENTS

| | | | |
|---|---|---|---|
| 728,214 | 5/1903 | Dunham | 10—75 |
| 1,761,733 | 6/1930 | Locke | 80—62.3 |
| 2,306,806 | 12/1942 | Hoopes | 10—86 |
| 3,029,856 | 4/1962 | Abbott | 151—21 |
| 3,139,636 | 7/1964 | Abbott | 10—86 |
| 3,142,325 | 7/1964 | Swanstrom | 151—21 |
| 3,165,767 | 1/1965 | Beltoise | 10—86 |

FOREIGN PATENTS 393,209  6/1933  Great Britain.

ANDREW R. JUHASZ, *Primary Examiner.*